No. 670,454. Patented Mar. 26, 1901.
G. W. NISTLE.
COMMUTATOR.
(Application filed Jan. 29, 1901.)
(No Model.)
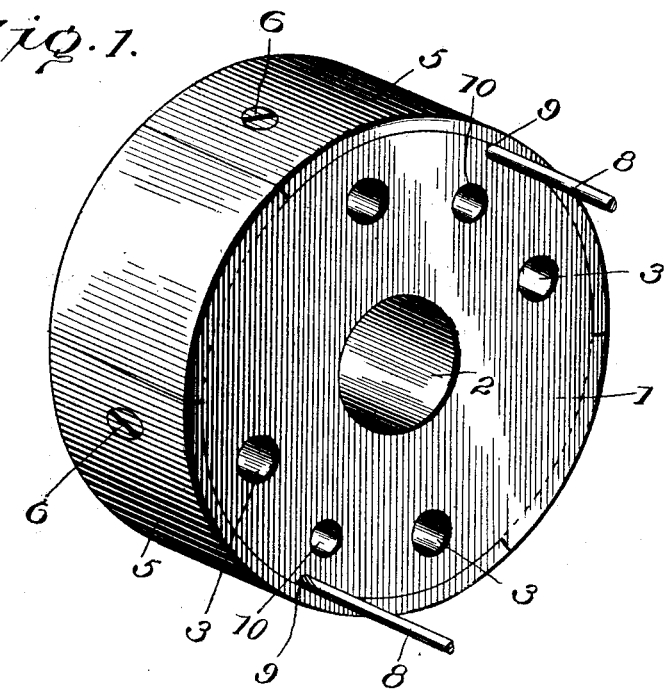
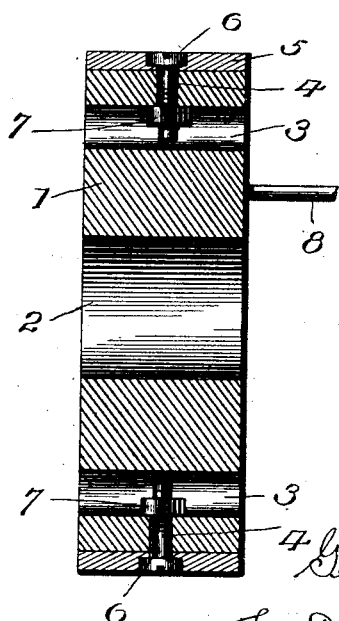
Inventor
George W. Nistle
By Thos. E. Robertson Attorney
Witnesses

UNITED STATES PATENT OFFICE.

GEORGE W. NISTLE, OF CHICAGO, ILLINOIS.

COMMUTATOR.

SPECIFICATION forming part of Letters Patent No. 670,454, dated March 26, 1901.

Application filed January 29, 1901. Serial No. 45,237. (No model.)

*To all whom it may concern:*

Be it known that I, GEORGE W. NISTLE, a citizen of the United States, residing at Chicago, in the county of Cook, State of Illinois, have invented a certain new and useful Improvement in Commutators, of which the following is a specification, reference being had to the accompanying drawings.

This invention relates to an improvement in commutators for dynamos, motors, and other electrical devices; and its objects are to simplify the construction, cheapen the cost, and provide a commutator which can be readily repaired, if necessary.

With these objects in view my invention consists in the peculiar construction, arrangement, and combinations of parts hereinafter more particularly described and then definitely claimed at the end hereof.

In the accompanying drawings, which represent the simplest embodiment of my invention, Figure 1 is a perspective view of my commutator, and Fig. 2 is a vertical central section of the same.

Referring now to the details of the drawings by numerals, 1 represents a disk, which I prefer to make of slate, although any other suitable insulating material may be used, if preferred. This disk is provided with the usual opening 2 for the shaft of the dynamo or other electrical machine and is also provided with a series of openings 3, preferably running entirely through the disk and parallel with the shaft-opening 2. A number of holes 4 are drilled or otherwise formed in the disk, so as to lead into these openings 3 from the periphery of the disk for a purpose to be explained.

The commutator plates or segments 5 are secured to the outer edge or periphery of the disk 1 by means of screws or bolts 6 countersunk into said plates or segments and passing through the aforesaid openings 4, nuts 7 being provided within the openings 3 to secure said plates or segments to the disk.

The commutator plates or segments 5 are connected with the wires 8 by means of perforations 9, formed in the disk 1. It is usual in commutators with which I am familiar to solder these wires to the commutator-segments, but by properly proportioning the size of the opening 9 the wires 8 can be secured in place by pinching the same between the commutator plates or segments and the wall forming the opening 9, this pinching of course being regulated by tightening the nuts 7 on the screws 6 as the commutator plate or segment is secured in position. Other openings or perforations 10 may be provided in the slate disk to allow the wires to pass through the same, if this should be necessary.

From the foregoing description and accompanying drawings it will be seen that I have produced a commutator of the simplest construction, which consists merely of a disk (or disks, if preferred) arranged to be mounted on a shaft and have holes drilled horizontally through it and other holes drilled at right angles thereto, whereby screws may pass through the commutator plates or segments into nuts situated within the first-mentioned holes, so that the segments may be firmly clamped to the slate disk. It will also be seen that the construction is such that the conducting-wires may also be secured by the same screws which are used to fasten the segments to the disk, although it is obvious that, if preferred, said wires may be soldered to the segments in the usual manner.

From the simplicity of construction and the manner in which the parts are connected to the insulating-disk it is manifest that the segments and wires may be readily removed and replaced if occasion should require it.

What I claim as new is—

1. A commutator formed of a disk of insulating material and having an opening drilled therein substantially parallel with and independent of the shaft-opening, and an opening passing from the periphery of the disk to the aforesaid opening, substantially as described.

2. A commutator formed of a disk of insulating material and having an opening therein substantially parallel with and independent of the shaft-opening and an opening passing from the periphery of the disk to the aforesaid opening; a segment having a bolt or screw entering the peripheral opening; and a nut on said bolt or screw situated within the horizontal opening; substantially as described.

3. A commutator-disk having a segment and conducting-wires; and a screw or bolt securing said wires in contact with the segment, the screw serving the double function of holding the plate to the disk and securing the conducting-wire to the segment, substantially as described.

4. A commutator formed of a disk of insulating material and having peripheral openings therein; a segment; screws securing said segment to said disk by passing into the said peripheral openings; and a conducting-wire secured to said segment by being pinched between the segment and the disk, substantially as described.

5. A commutator formed of a disk of insulating material and having peripheral openings therein; a segment; screws securing said segment to said disk by passing into the said peripheral openings, an opening between the segment and the disk; and a conducting-wire secured in said opening; substantially as described.

6. A commutator formed of a disk of insulating material and having substantially horizontal openings therein independent of the shaft-opening, and openings running from the periphery into said horizontal openings; a segment on said disk; and a screw or bolt passing through said segment and the peripheral opening; and a nut on said screw situated within the horizontal opening and securing the segment on the disk; substantially as described.

In testimony whereof I affix my signature, in the presence of two witnesses, this 24th day of January, 1901.

GEORGE W. NISTLE.

Witnesses:
F. J. ZORN,
O. H. MAATSCH.